United States Patent Office 3,490,745
Patented Jan. 20, 1970

3,490,745
NICKEL COMPLEX CATALYST COMPOSITIONS
Sterling F. Chappell III, and Jerome R. Olechowski, Lake Charles, and Arthur A. Arseneaux, New Orleans, La., assignors to Columbian Corbon Company, New York, N.Y., a corporation of Delaware
No Drawing. Filed Oct. 5, 1966, Ser. No. 584,358
Int. Cl. B01j 11/00, 11/84; C08f 1/28
U.S. Cl. 252—430
30 Claims

ABSTRACT OF THE DISCLOSURE

Processes are described for preparing nickel complex catalyst compositions by reducing a nickel (II) or nickel (III) compound with an organometallic reducing agent in the presence of carbon monoxide and a molecular organic Lewis base. These complexes are shown to be useful as catalysts for the production of homooligomers of conjugated dienes and cooligomers of these dienes with ethylene, styrene, acetylenes, vinyl halides or alpha, beta-unsaturated carbonyl and nitrile compounds.

---

This invention relates to catalyst compositions, and more particularly to active nickel catalyst compositions which are especially useful in the oligomerization of aliphatic conjugated diolefin-containing monomer feeds.

It is known to oligomerize 1,3-butadiene or like conjugated diolefins by contacting the diolefin or a mixture of diolefin and ethylene in the liquid phase with a preformed molecular organic Lewis base complex of nickel (0), such as one having the structural formula: $(L)_n Ni(CO)_{4-n}$ wherein L is a molecular Lewis base, preferably an ester of a trivalent Group V–A element having an atomic weight of from about 30 to about 209, and $n$ is an integer from 0 to 4 inclusive. Catalyst compositions of this type have heretofore been prepared by contacting nickel tetra carbonyl with an organic molecular Lewis base, such as triphenyl arsine, optionally in the presence of an activator compound, such as triethyl-aluminum. While such preformed complexes are effective in the homo-oligomerization of butadiene or the co-oligomerization of butadiene with ethylene, they have not been widely used commercially because of their limited availability, a fact attributable largely to the difficulty and expense involved in their conventional synthesis from extremely toxic nickel tetra carbonyl.

An alternate known procedure, which avoids the necessity of handling nickel tetra carbonyl and which generally can be conducted under somewhat milder reaction conditions, involves oligomerizing a conjugated diene, such as butadiene, in the presence of a positive valence nickel compound and a metal alkyl, such as triethylaluminum. The catalyst composition which is prepared in situ in such reaction system is believed to be a complex of the Lewis base diene and nickel (0). A major disadvantage of this method is that the reaction rate is relatively slow and as much as 24 hours or more may be required to achieve reasonable monomer conversion levels.

Accordingly, it is one object of the present invention to provide an improved active nickel coordination catalyst.

It is another object of the invention to provide an improved active nickel coordination catalyst which when employed in the oligomerization of conjugated diolefin-containing monomer feeds, e.g. 1,3-butadiene or a mixture of 1,3-butadiene and ethylene or like co-monomer, enables the reaction to proceed at a relatively rapid rate.

It is still another object of the invention to provide an improved process for preparing an active nickel coordination catalyst.

Various other objects and advantages of the invention will become apparent to those skilled in the art from the following detailed description thereof.

The present invention is predicated on our discovery that conjugated diolefinic hydrocarbons may be effectively oligomerized by contacting the diolefin with a catalyst composition produced by admixing the diene, under substantially anhydrous conditions, with a nickel (positive valence) compound, a metal alkyl, such as triethyl aluminum, and carbon monoxide. More particularly, we have now surprisingly found that such catalyst composition permits the homo-oligomerization of conjugated diolefins or co-oligomerization of conjugated diolefins with a co-monomer to proceed at a decidedly more rapid rate than the prior art in situ catalysts as described above. Furthermore, we have found that the homo-oligomerization of 1,3-butadiene according to the process of our present invention results in exceptionally high selectivities of cyclododecatriene ($C_{12}$) products, e.g. 1,5,9-cyclododecatriene, and that the cooligomerization of butadiene and ethylene results in exceptionally high selectivities of $C_{10}$ oligomers, e.g. 1,5-cyclodecadiene and 1,4,9-decatriene.

As noted above, the catalyst compositions utilized in the practice of the present invention are prepared by admixing under substantially anhydrous conditions a nickel (positive valence) compound, a reducing agent capable of reducing the valence of nickel to below 2 (e.g. 0), a molecular organic Lewis base and carbon monoxide. In general, any nickel compound having a formal valence of +2 or +3 is useful in preparing the catalyst composition. Examples of such suitable nickel sources include inorganic nickel compounds, such as nickel bromide, nickel carbonate, nickel chloride, nickel chlorate, nickel acetate, nickel benzene sulfonate, nickel benzoate, nickel citrate, nickel 2-ethylhexonate, nickel naphthenate, nickel oxalate, nickel stearate, nickel acetylacetonate, nickel benzoylacetonate and nickel dimethylglyoxime; complexes of inorganic nickel salts, such as tris(N-methylpyrrolidone)nickel (II) bromide. From a practical viewpoint, it is often desirable to prepare the catalyst utilized in the practice of this invention in a hydrocarbon solvent. Accordingly, nickel compounds which has a significant solubility in such hydrocarbons represent a preferred group. Illustrative of this preferred group are the nickel salts of carboxylic acids containing at least six (6) carbon atoms, halogen acids and nickel compounds of organic chelating groups such as acetylacetone, benzoylacetone, dimethylglyoxime, glycine, 8-hydroxyquinoline, nitrosophenylhydroxylamine and salicylaldehyde.

Any reducing agent which is capable under substantially anhydrous conditions of lowering the valence of nickel in a normal oxidation state of two or three to a value of less than two, and preferably to zero, is suitable for use in the present invention. Illustrative of such reducing agents are hydrogen, the hydrazines, and metals of Groups I–A, II–A, II–B, III–A and IV–A, as well as hydride and organometallic compounds of these metals and of boron. Specific examples of suitable reducing agents include hydrazine, methyl hydrazine, unsymmetrical dimethyl hydrazine, lithium, sodium, potassium, beryllium, magnesium, calcium, stronitium, barium, zinc, cadmium, mercury, aluminum, gallium, indium, germanium, tin, lead, n-butyl lithium, phenyl sodium, alkyl sodium, sodium hydride, diethyl magnesium, phenyl magnesium bromide, calcium hydride, diethyl zinc, mercuric hydride, aluminum hydride, trimethylaluminum, tricyclohexylaluminum, diethylaluminum chloride, ethylaluminum dichloride, ethoxydiethylaluminum, diisobutylaluminum hydride, tetraethyl lead, diborane, dimethyl borane, tetraborane, lithium aluminum hydride, and sodium aluminum tetraethyl. The use of the hydride and organometallic compounds of the aforementioned non-transition metals, which represent a preferred group of reducing agents, results in a particularly active and selective catalyst composition for use in the practice of the invention and facilitates the isolation of the desired homo-oligomers or co-oligomers from the reaction mixture. An especially preferred group of reducing agents can be represented by the formula:

$$R_a AlX_b$$

wherein R is a hydride or hydrocarbyl radical, X is a halide or hydrocarboxy radical, $a$ is from 1 to 3 $b$ is from 0 to 2 and the sum of $a$ plus $b$ is 3. Illustrative of such compounds are trimethylaluminum, triethylaluminum, tri-i-buthylaluminum, trioctylaluminum, tridodecylaluminum, tricyclohexylaluminum, triphenylaluminum, tritolylaluminum, ethoxydiethylaluminum, diethoxyethylaluminum, butylaluminum dihydride, diethylphenylaluminum, aluminum trihydride, diethylaluminum chloride, monoethylaluminum dichloride and ethylaluminum sesquehalide, i.e. a mixture of diethylaluminum chloride and ethylaluminum dichloride or a mixture of triethylaluminum trichloride. Particularly preferred aluminum compounds for the purposes of this invention are the trialkylaluminum compounds.

Any molecular organic Lewis base can be admixed with carbon monoxide, the nickel compound and the reducing agent in preparing the catalyst compositions of the present invention. As used herein and in the appended claims, the term "molecular organic Lewis base" is intended to designate any organic molecule having at least one pair of electrons available for sharing with nickel. Such compounds are well known in the art and include ethylencially-unsaturated hydrocarbons, ethers, hydrocarbyl esters of sulfric acids, heterocylic sulfur compounds, and organic derivatives of trivalent Group V–A elements.

Exemplary of ethylenically-unsaturated hydrocarbons suitable as Lewis bases are the aliphatic conjugated diolefins, such as 1,3-butadiene, 2-methyl-1,3-butadiene (isoprene), 2-chloro-1,3-butadiene (chloroprene), 2,3-dichloro-1,3-butadiene, 1,3-pentadiene (piperylene), 2,3-dimethyl-1-butadiene and phenyldiolefins. Partially substituted halogen derivatives may also be used, including mixed halogen derivatives, such as chloro-fluoro1,3-butadienes. Open chain conjugated dienes such as 2,4-hexadiene are also somewhat useful.

Cyclic aliphatic compounds containing at least two double bonds and one or more carbocyclic rings, the unsaturation being in a single ring or in adjoining rings, are also useful. Thus, bridged-ring multi-enes, such as bicyclo (2.2.1) hepta-2,5-diene (norbornadiene), 2-methylnorbornadiene, 2-propylnorbornadiene, 2-i-propylnorbornadiene, 2-n-butylnorbornadiene, 2-i-butylnorbornadiene, 2-t-butylnorbornadiene, 2-n-amylnorbornadiene, 2-(3-methyl) butylnorbornadiene, 2 - neopentylnotbornadiene, 2-n-hexylnorbornadiene, 2 - n - octylnorbornadiene, 2-n-hexylnorbornadiene, 2-n-octylnorbornadiene, 2-n-nonylnornadiene, 2-n-dodecylnorbornadiene, 2-n-heptadecylnorbornadiene, bicyclopentadiene, bicyclo (2.2.2) octa-2,5-diene and bicyclo (3.2.1) octa-2,5-diene may be employed, for instance. Furthermore, single ring carbocyclic multi-enes may be used including 1,5-cyclooctadiene, 1,3-cyclooctadiene, dimethyl-1,5-cyclooctadiene, 1,5,9-cyclododecatriene, 1,5-cyclodecadiene, 1,6-cyclodecadiene, 1,5-cyclododecadiene, 1,3-cyclododecadiene and 1,3-cyclohexadiene may be used. In addition, functionally-substituted olefins are also somewhat useful as Lewis bases. For instance, compounds containing alpha-beta-unsaturation with respect to the functional group may be employed. Accordingly, compounds such as acrylonitrile, acrolein, crotonaldehyde, cinnamaldehyde, mesityl oxide, etc., are useful.

Ethers suitable as Lewis bases include the heterocyclic ethers, such as tetrahydrofuran, tetrahydropyran, dioxane, etc.

Exemplary of the hydrocarbyl esters of sulfur acids are the sulfoxides and sulfides, such as dimethyl sulfoxide and dimethyl sulfide. Heterocyclic sulfur compounds which may be used as Lewis bases include thiophene, thiozole, and 2-chlorothiophene.

Among the organic derivatives of Group V–A elements which are useful are the trihydrocarbyl esters of Group V–A elements having an atomic weight of from about 30 to about 209. Thus, triethylphosphite, tri(2-ethylhexyl) phosphite, di(2-ethlyhexyl) hydrogen phosphite, triphenylphosphite, di(p-tolyl) hydrogen phosphite, tri(p-tolyl) phosphite, triphenylphosphine, triethylarsine, triphenylsarsine, triphenylstibine, triphenylantimonite, and triethylbismuthine may be employed as Lewis bases. Organic derivatives of nitrogen may also be successfully employed. Accordingly, amines such as trimethylamine, dioctylamine, tricyclohexylamine, triphenylamine, aniline, N-methylaniline, ethylene diamine and ethanolamine are useful. Likewise, heterocyclic nitrogen compounds including pyrrole, pyridene, pyrazole, 3-pyrroline, pyrrolidine, pyrimidine, purine, quinoline, isoquinoline and carbozole are operable. The organic derivatives of nitrogen which are especially preferred Lewis bases are the acylamido compounds, particular those corresponding to the formula:

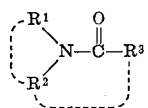

wherein $R^1$ alone is selected from the group consisting of hydrogen, hydrocarbyl and substituted hydrocarbyl radicals, $R^2$ alone is selected from the group consisting of $R^1$, hydroxy, hydrocarboxy, nitroso, amino, carbonyl and

radicals, $R^3$ alone is selected from the group consisting of hydrocarbyl, substituted hydrocarbyl, hydrocarboxy and amino radicals, and

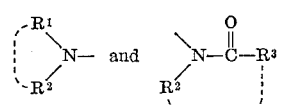

each represent a heterocyclic radical having 5 to 6 inclusive ring members. It will, of course, be understood that the broken lines in the above formula between $R^1$ and $R^2$ as well as between $R^2$ and $R^3$ indicate that such chemical bonds are optional; i.e. that such bonds exist only when $R^1$ and $R^2$ or $R^2$ and $R^3$ represent segments of a nitrogen containing heterocyclic ring. Suitable acylamido compounds include amides, such as acetamide, benzamide, succinamide, N-methylacetamide, N,N-diethylacetamide, and N,N-dimethylformamide; imides, such as phthalimide, succinimide, N-nitrososuccinimide, N-phenylsuccinimide, N-phenylmaleimide, N-methylsuccinimide, N - methylphthalimide. N - acetyltetrahydrophthalimide, N-benzoylsuccinimide, and N-benzoylphthalimide; ureas, such as urea, N,N'-diethylurea and N,N'-dimethylurea; carbamates, such as ethylcarbamate and isopropylcarbamate; and lactams, such as caprolactam,
pyrrolidone($\gamma$-butylrolactam),
piperidone($\delta$-valerolactam)N-nitroso-2-pyrrolidone,
N-methyl-2-pyrrolidone,
N-vinyl-2-pyrrolidone,
N-acetyl-2-pyrrolidone,
N-acetyl-$\epsilon$-caprolactam,
N-benzoyl-$\epsilon$-caprolactam,
N-benzoyl-$\delta$-valerolactam,
N-ethylcarbamyl-$\epsilon$-caprolactam,
N-propionyl-$\omega$-caprolactam,
N-tolyl-$\omega$-decanolactam,
5-methyl-N-methyl-2-pyrrolidone,
4-methyl-N-methyl-2-pyrrolidone,
4-ethyl-N-vinyl-2-pyrrolidone, and
N-methyl-2-piperidone.

In preparing the catalyst compositions, the reducing agent may be employed in an amount such that the molar ratio of reducing agent to nickel (positive valence) compound is from about 0.1:1 to 50:1, although it is seldom necessary or desirable to operate outside of the preferred range of from about 0.25:1 to about 25:1, and particularly from about 1:1 to about 12:1. The carbon monoxide may be suitably employed in a molar ratio to nickel of from about 0.3:1 to about 3.5:1, preferably 0.5:1 to about 1.5:1. The preferred Lewis bases for preparing the catalyst compositions are the conjugated diolefins particularly butadiene. Thus, the catalyst compositions may be prepared in a suitable inert solvent by admixing the nickel compound, reducing agent, and carbon monoxide in the relative proportions recited above with at least about 0.5 mole of butadiene per mole of nickel compound, preferably at least about 2.0 moles of butadiene per mole of nickel compound. It is generally not necessary to use more than about 6.0 moles of butadiene or like conjugated diolefin Lewis base per mole of nickel compound to produce the desired catalytic effect.

While butadiene is the preferred Lewis base, other molecular organic compounds having at least one electron pair available for sharing with nickel may also be employed in lieu of or in conjunction with butadiene in an amount of from about 0.5 to about 6.0 moles per mole of nickel compound. Indeed, in accordance with a preferred embodiment of our invention, an organic derivative of a Group V-A element, particularly a derivative of nitrogen such as an acylamido compound corresponding to the structural formula set forth above, is employed in conjunction with 1,3-butadiene as a co-Lewis base. The acylamido compound is desirably employed in a molar ratio to nickel compound of from about 2.5:1 to about 3.5:1, while the molar ratio of butadiene to nickel compound desirably is at least about 2:1, e.g. 2:1 to about 6:1. It has been found that the conjunctive use of 1,3-butadiene and an acylamido compound as Lewis bases results in the formation of an active nickel coordination catalyst complex which significantly reduces the formation of undesirable low molecular weight solid polymeric by-products of the oligomerization of aliphatic conjugated diolefins. N-methyl-2-pyrrolidone is an especially suitable acylamido compound for this purpose.

The solvent used in preparing the catalyst composition may be any inert organic solvent, such as benzene, toluene, petroleum naphtha, hexane, heptane, isooctane, cyclohexane, etc.

The nickel coordination complex is especially effective in catalyzing the oligomerization of a monomer feed comprising an aliphatic conjugated diolefin. Butadiene is the preferred aliphatic conjugated diolefin. However, other conjugated diolefins, such as isoprene and piperylene, may also be employed. If desired, peroxides may be removed from the diene feed prior to oligomerization by treatment with ferrous salts, thiosulfates, or sulfites, according to available methods.

As previously noted, the conjugated diolefin monomers may be oligomerized in the presence of the catalyst compositions of this invention to produce predominantly cyclic oligomers, particularly those having twelve (12) carbon atoms in the carbocyclic ring, such as 1,5,9-cyclododecatriene. Furthermore, the active nickel coordination complexes effectively and rapidly catalyze the co-oligomerization of conjugated diolefins and a comonomer selected from the group consisting of (1) hydrocarbons having the formula:

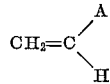

wherein A is selected from the group consisting of phenyl and hydrogen radicals; (2) acetylenic hydrocarbons; (3) vinyl halides; and (4) $\alpha,\beta$-unsaturated carbonyls and nitriles. Exemplary of specific co-monomers are ethylene, styrene, divinylbenzene, vinyl chloride, acetylene, propyne, acrolein, crotonaldehyde, methylacrylate, methylmethacrylate and acrylonitrile. The preferred co-monomers are ethylene and styrene. Thus, the co-oligomerization of two (2) moles of butadiene and one (1) mole of ethylene may be effected in the presence of the active nickel coordination complexes of this invention to produce cyclic diolefins containing ten (10) ring carbon atoms, such as 1,5-cyclodecadiene, in high yields, as well as normal 1,4,9-decatriene. Likewise, 1,3-butadiene (2 moles) and styrene (1 mole) may be co-oligomerized in the presence of our catalyst compositions to 1-phenyl derivatives of cyclic and normal unsaturated hydrocarbons, such as 1-phenyl-1,4,9-decatriene and 1 - phenyl - 3,7 - cyclodecadiene.

Oligomerization reactions effected in the presence of our catalyst compositions may be suitably carried out in an inert organic solvent, such as one used in preparing the catalyst composition under substantially anhydrous conditions. While the oligomerization reactions do not form a part of the present invention, the following reaction conditions are presented for illustrative purposes. The temperature at which the oligomerization reaction is carried out may vary over a wide range, such as from about 0° C. to about 180° C., although the range of 20° C. to 150° C., particularly 30° C. to 100° C., is generally most preferred. In general, reactions conducted at temperatures below about 20° to 30° C. are quite slow, while operating temperatures above about 100° to 150° C. may result in diminished yields of the desired oligomer product. Furthermore, in co-oligomerization of butadiene with ethylene higher reaction temperatures tend to favor formation of linear decatriene product. When it is desired to produce predominantly 1,5-cyclodecadiene, temperatures below about 80° C. are preferred. Optimum pressure is dependent on the particular monomer(s) oligomerized. Thus, in the oligomerization of 1,3-butadiene, the reaction pressure may range from about 10 to about 500 p.s.i.g., or higher. On the other hand, the co-oligomerization of butadiene and ethylene may be advantageously conducted using pressures up to about 3,000 p.s.i.g., or higher. The concentration of catalyst in the reaction mixture may advantageously range from about 0.01 to about 10% by weight of the monomer(s), although concentrations within the range of 0.1% to about 2.0% are usually most preferred.

If desired, polymerization inhibitors may also be included in the reaction mixture, for instance, in an amount of from about 0.001% to about 4.0% based on the weight of the monomer feed. Suitable polymerization inhibitors are well known to the art and include phenol, catechol, p-tert-butyl catechol, resorcinol and hydroquinone.

Following completion of the oligomerization reaction, conventional techniques may be employed to deactivate the catalyst composition and recover the desired oligomer products. One suitable catalyst deactivation procedure involves contacting the reaction mixture with aqueous methanol.

In producing co-oligomers of butadiene and ethylene or butadiene and styrene, for instance, 1,5-cyclodecadiene or 1-phenyl-3,7-cyclodecadiene, butadiene and the co-monomer may be contacted with the active nickel coordination complex in a molar ratio of from about 1:1 to about 3:1. However, butadiene:co-monomer mole ratios of from about 0.05:1 to about 20:1 may also be used. It should be noted, however, that lower butadiene: co-monomer molar ratios within the specified ranges tend to favor the formation of linear oligomer product.

The catalyst compositions of the invention, and the effectiveness of the compositions as aligomerization catalyst will now be further illustrated with reference to the following specific examples, which are not to be interpreted as limiting the scope of the invention.

Examples 1–2

Examples 1 and 2 illustrate the advantages obtained by preparing the catalyst composition in the presence of carbon monoxide, in accordance with the present invention. The examples also illustrate the in situ preparation of the catalyst composition in the presence of 1,3-butadiene monomer, whereby a butadiene-nickel (0) complex is formed which catalyzes the oligomerization of the remaining butadiene.

In each of Examples 1–2, a clean dry 300 ml. stainless steel autoclave equipped with a magnetic stirrer was flushed with argon, evacuated and then charged with 25 ml. of benzene, 3.9 millimoles of nickel acetylacetonate, 19.5 millimoles of triethylaluminum and 100 grams of butadiene. In Example 2, which represents the run in accordance with the present invention, carbon monoxide (3.9 millimoles) was also added to the autoclave prior to reducing the valence of nickel by the addition of triethylaluminum. Following charging of the reactants, the contents of the autoclave were stirred and the temperature was raised to 80° C. The reaction in each case was carried out to a butadiene conversion of about 85–90%. Yield of 1,5,9-cyclododecatriene was high in both cases. However, in the run employing carbon monoxide in accordance with the invention (Example 2), the desired butadiene conversion was obtained at a reaction time of 25 minutes, while a reaction time of 150 minutes was required in Example 1 (no CO employed in catalyst preparation) to obtain 85–90% butadiene conversion.

Examples 3–4

The procedures of Examples 1 and 2 were substantially repeated except that 11.7 millimoles of N-methyl-2-pyrrolidone were charged to the autoclave in each case as a co-Lewis base with 1,3-butadiene. A butadiene conversion of 85–90% was achieved at about 180 minutes when CO was not added during catalyst preparation (Example 3), and at about 30 minutes when CO was employed during catalyst preparation (Example 4). The employment of N-methylpyrrolidone as a Lewis base in conjunction with butadiene substantially decreased formation of undesirable low molecular weight solid polymer.

Examples 5–6

Examples 5–6 illustrate the preparation of 1,5-cyclodecadiene from a monomer mixture of 1,3-butadiene and ethylene using the catalyst composition of the invention (Example 6) compared to using a catalyst composition not formed in the presence of carbon monoxide (Example 5).

In Example 5, a 500 ml. autoclave was charged with 11.2 grams of a 9.0% solution of nickel acetylacetonate in benzene, 75 ml. of benzene, 6.5 ml. of a 20% solution of triethylaluminum in benzene, 10 grams of butadiene and 60 grams of ethylene. The reaction temperature was raised to about 50° C. and the contents of the autoclave were stirred. While maintaining temperature of 50° C., 180 grams of butadiene were pumped into the autoclave by means of a Lapp pump at a rate such that the reaction pressure was maintained at 80–100 p.s.i.g. Approximately 20 hours were required for butadiene addition.

The recovered reaction mixture was analyzed by gas chromatography to give the following selectivities.

TABLE 1

| | Wt. percent |
|---|---|
| Cyclooctadiene and vinylcyclohexene | 22.8 |
| 1,4,9-decatriene | 8.2 |
| 1,5-cyclodecadiene | 27.6 |
| 1,5,9-cyclododecatriene | 31.3 |
| Non-volatiles | 10.1 |

In accordance with Example 6, 0.11 gram of carbon monoxide were also charged to the autoclave prior to adding the bulk of the butadiene. With the autoclave contents at 50° C., 180 grams of butadiene were introduced at a rate such that the reaction pressure was maintained between about 80 to 100 p.s.i.g. Only 2½ hours were required to add the requisite amount of butadiene compared to about 20 hours in Example 5, which indicates that the presence of carbon monoxide during catalyst formation enhances the reaction rate of the subsequent oligomerization reaction. Gas chromatography indicated the following product selectivities:

TABLE 2

| | Wt. percent |
|---|---|
| Cyclooctadiene and vinylcyclohexene | 4.0 |
| 1,4,9-decatriene | 3.0 |
| 1,5-cyclodecadiene | 77.5 |
| 1,5,9-cyclododecatriene | 14.4 |
| Non-volatiles | 1.1 |

Besides increasing reaction rate, it will also be noted from a comparison of the data set forth in Tables 1 and 2 that significantly higher 1,5-cyclodecadiene selectivity was obtained by carrying out the butadiene-ethylene co-oligomerization reaction with the catalyst of the present invention (i.e., Example 6).

Examples 7–9

The following co-oligomerization reactions of butadiene and ethylene were carried out in accordance with Examples 7–9, which demonstrate the necessity of a Lewis base, e.g. butadiene, during catalyst preparation. In Example 7, triethylaluminum, nickel acetylacetonate and carbon monoxide were mixed together in a mole ratio of 2.5:1:1 prior to charging the autoclave with the monomers. In Example 8, triethylaluminum, nickel acetylacetonate and carbon monoxide were mixed together in the same mole ratio in the presence of ethylene only, while in Example 9, the catalyst components were mixed together in the presence of both butadiene and ethylene. The reaction conditions and results were as set forth in Table 3, below. In Table 3, 1,5-cyclodecadiene is abbreviated as $C_{10}D_5$; 1,4,9-decatriene is abbreviated as $nC_{10}T$; 1,5,9-cyclododecatriene is abbreviated as CDT.

Example 10

Triethylaluminum, N-methylpyrrolidone, carbon monoxide, nickel naphthenate, butadiene, ethylene and benzene solvent were charged to a 10 ml. autoclave. The mole ratio of Al:N-MP:CO:Ni was 2.5:3:1:1, and butadiene:ethylene mole ratio was 1.4:1. The catalyst concentration was 1.0 weight percent. The reaction was carried out at a temperature of 50° C. for five (5) hours. Butadiene conversion was 90.6%, and ethylene conversion was 56.5%. The recovered reaction product was analyzed by gas chromatography with the following results:

TABLE 3

| Example | Reaction time (hrs.) | Temp. (° C.) | Cat. conc. (percent w.) | Butadiene: ethylene mole ratio | Butadiene conversion (percent w.) | Ethylene conversion (percent w.) | Product selectivity | | | | |
|---|---|---|---|---|---|---|---|---|---|---|---|
| | | | | | | | $C_{10}D_5$ | $nC_{10}T$ | CDT | Others | Non-volatile |
| 7 | 6 | 60 | 0.5 | 1:75:1 | No conversion | | No conversion | | | | |
| 8 | 6 | 60 | 0.5 | 1:75:1 | Low conversion | | Qualitative VPC shows $C_{10}D_5$ | | | | |
| 9 | 6 | 60 | 0.5 | 1:75:1 | 90 | 60 | 68.3 | 4.4 | 15.4 | 9.5 | 2.2 |

TABLE 4

|  | Wt. percent |
|---|---|
| 1,5-cyclodecadiene | 72.4 |
| 1,4,9-decatriene | 3.8 |
| 1,5,9-cyclododecatriene | 12.5 |
| Others | 7.3 |
| Non-volatiles | 4.0 |

Examples 11–13

Examples 11–13 further illustrate the advantageous use of N-methyl-2-pyrrolidone in conjunction with butadiene as a Lewis base in preparing the nickel coordination catalysts.

Triethylaluminum, carbon monoxide, N-methylpyrrolidone, nickel naphthenate, butadiene and ethylene were mixed together in a benzene solvent in the mole ratios noted in Table 5, below, and the co-oligomerization of butadiene and ethylene was conducted with the following results. In the table, "Ni" represents nickel contained in nickel naphthenate, "N-MP" represents N-methyl-pyrrolidone and "TEA" represents triethylaluminum.

of undesirable low molecular weight solid polymer (non-volatiles) significantly decreased.

Examples 14–18

These examples illustrate the use of various reducing agents in preparing the nickel (0) catalyst compositions. Nickel acetylacetonate was reduced by means of the reducing agents set forth in Table 6, below, in the presence of carbon monoxide, N-methylpyrrolidone, butadiene and ethylene in a benzene solvent. In each case, butadiene: ethylene mole ratio was 1.75:1, and the mole ratio of reducing agent:N-methylpyrrolidone:CO:nickel acetylacetonate was 4:3:1:1. Catalyst concentration was 1.0 wt. percent. Furthermore, reaction temperature in each case was about 50° C. while reaction time was four (4) hours.

TABLE 6

| Example | Reducing agent | Conv., percent | Selectivity | | | | |
|---|---|---|---|---|---|---|---|
| | | | COD | $C_{10}T$ | $C_{10}D_5$ | CDT | Non-Vol. |
| 14 | Phenylmagnesium bromide | 45 | 14.5 | 1.3 | 55.5 | 18.4 | 5.3 |
| 15 | Butyllithium | 25 | 38.5 | | 44.5 | 10.8 | 6.1 |
| 16 | Sodium borohydride | 10 | Qualitative VPC shows $C_{10}D_5$ | | | | |
| 17 | Tributylaluminum | 85 | 5.2 | 5.0 | 71.5 | 14.2 | 2.0 |
| 18 | Dibutylaluminum hydride | 91 | 6.8 | 2.7 | 73.0 | 13.0 | 2.1 |

It will be noted that while aluminum compounds are the preferred reducing agents, other reducing agents may also be used with some advantage.

Examples 19–21

These examples illustrate the use of various acylamido compounds other than N-methyl-2-pyrrolidone in conjunction with butadiene in preparing active nickel (0) catalysts complexes. In each case, triethylaluminum, the acylamido compound, carbon monoxide and nickel acetylacetonate were admixed in a molar ratio of 4:2.5:1:1 in the presence of butadiene and ethylene in a molar ratio of 1.75:1 in benzene solvent. Catalyst concentration was 1.0 wt. percent. The operating temperature was about 50° C., and the reaction time was about 4 hours in each case. The results were as follows:

TABLE 7

| Example | Acylamido Comp. | Butadiene Conv.(w. percent) | Selectivities | | | | |
|---|---|---|---|---|---|---|---|
| | | | COD | $C_{10}T$ | $C_{10}D_5$ | CDT | Non-Vol. |
| 19 | N,N-dimethylformamide | 83 | 3.4 | 6.4 | 72.6 | 11.1 | 5.9 |
| 20 | Succinamide | 71 | 4.3 | 8.1 | 66.6 | 10.9 | 10.1 |
| 21 | N-methyl-2-piperidone | 77 | 3.6 | 10.1 | 68.3 | 10.9 | 7.1 |

Examples 22–25

These examples illustrate the use of various Lewis bases other than acylamido compounds in conjunction with butadiene in preparing the active nickel (0) catalysts complexes of the invention. In each case, triethylaluminum, co-Lewis base, carbon monoxide and nickel acetylacetonate were admixed in a molar ratio of 4:3:1:1 in

TABLE 5

| Ex. | Mole Ratios | | Cat. Conc. (wt. percent) | Temp. (° C.) | Time (hrs.) | Conv., percent | Selectivities | | | | |
|---|---|---|---|---|---|---|---|---|---|---|---|
| | TEA:N-MP:CO:Ni | Butadiene: ethylene | | | | | COD | $C_{10}T$ | $C_{10}D_5$ | CDT | Non-Vol. |
| 11 | 4:1:1:1 | 1.75:1 | 1 | 50 | 4 | 66 | 3.1 | 5.2 | 64.0 | 16.2 | 12.0 |
| 12 | 4:2:1:1 | 1.75:1 | 1 | 50 | 4 | 85 | 5.3 | 2.4 | 71.5 | 14.7 | 6.0 |
| 13 | 4:3:1:1 | 1.75:1 | 1 | 50 | 4 | 81 | 4.0 | 1.6 | 77.0 | 15.5 | 2.0 |

It will be noted from the data set forth in Table 5 that as the concentration of N-methylpyrrolidone increased, selectivity of 1,5-cyclodecadiene increased and formation the presence of butadiene and ethylene in a molar ratio of 1.75:1 in benzene solvent. Catalyst concentration was 1.0 wt. percent. The operating temperature was about 50° C. and the reaction time was about 4 hours in each case. The results were as follows:

TABLE 8

| Example | Co-Lewis Base | Butadiene Conversion (wt. percent) | Selectivities | | | | |
|---|---|---|---|---|---|---|---|
| | | | COD | $C_{10}T$ | $C_{10}D_i$ | CDT | Non-Vol. |
| 22 | Ethanolamine | 81 | 3.5 | 10.1 | 67.6 | 10.8 | 8.1 |
| 23 | 2(1H)pyridone | 59 | 2.9 | 9.9 | 68.5 | 5.2 | 13.5 |
| 24 | Piperidine | 55 | 3.7 | 8.1 | 62.1 | 7.6 | 18.4 |
| 25 | Triphenyl-phosphine | 54 | 8.6 | 7.2 | 61.3 | 12.1 | 10.8 |

Example 26

A catalyst composition was prepared by mixing in benzene solvent 3.9 millimoles (mmoles) of nickel acetylacetonate, 11.7 mmoles of N-methyl-2-pyrrolidone, 3.9 mmoles of carbon monoxide and 15.6 mmoles of triethylaluminum. To the resultant composition was charged 1 mole of butadiene and 0.5 mole of ethylene and the temperature was maintained at about 50° C. for 3.5 hours. Butadiene conversion was about 59%. Selectivity of 1,4,9-decatriene product was about 3.0%, while selectivity of 1,5-cyclodecadiene was about 50%.

Examples 27–33

These examples illustrate the co-oligomerization of butadiene and styrene to form phenyl-substituted linear and cyclic oligomers using the active nickel catalysts of the invention. The reactions were carried out in a stirred, 300 ml. autoclave according to the conditions set forth in Table 9.

TABLE 9

| Autoclave Charge | Example | | | | | | |
|---|---|---|---|---|---|---|---|
| | 27 | 28 | 29 | 30 | 31 | 32 | 33 |
| Benzene solvent (ml.) | 35 | 35 | 35 | 35 | 35 | 35 | 35 |
| Nickel acetylacetonate (mmoles) | 3.9 | 3.9 | 3.9 | | | | |
| Nickel napthenate (mmoles) | | | | 3.9 | 3.9 | 3.9 | |
| Nickel chloride (mmoles) | | | | | | | 3.9 |
| N,N-dimethyl formamide (mmoles) | 11.7 | 11.7 | | 11.7 | | | |
| N-methyl-2-pyrrolidone (mmoles) | | | 11.7 | | 11.7 | 9.8 | 11.7 |
| Carbon monoxide (mmoles) | 3.9 | 3.9 | 3.9 | 3.9 | 3.9 | 3.9 | 3.9 |
| Triethylaluminum (mmoles) | 11.7 | 11.7 | 11.7 | | 15.6 | | 11.7 |
| Diethylethoxyaluminum (mmoles) | | | | 11.7 | | 11.7 | |
| Butadiene (moles) | 1 | 1 | 1 | 1 | 1 | 1 | 1 |
| Styrene (moles) | 0.5 | 0.5 | 0.6 | 0.5 | 0.6 | 0.6 | 0.55 |
| Oligomerization conditions: | | | | | | | |
| Reaction time (hrs.) | 1 | 1 | 2 | 2 | 1 | 4 | 1 |
| Reaction Temp. (° C.) | 80 | 40 | 50 | 90 | 50 | 40 | 40 |
| Total reaction pressure (p.s.i.g.) | 150 | 60 | 75 | 120 | 75 | 60 | 60 |
| Butadiene conversion (wt. percent) | 92 | 65 | 90 | 88 | 91 | 94 | 65 |
| Product selectivity (wt. percent): | | | | | | | |
| Vinylcyclohexene | 4.0 | 4.5 | 3.1 | 1.1 | 4.1 | 4.7 | 3.1 |
| 1,5-cyclooctadiene | 5.0 | 4.5 | 3.2 | 2.1 | 7.1 | 1.9 | 3.4 |
| 1,5,9-cyclododecatriene | 32.7 | 26.9 | 11.6 | 37.6 | 8.7 | 10.1 | 12.6 |
| 1-phenyl-3,7-cyclodecadiene | 3.5 | 58.3 | 55.6 | 4.9 | 61.3 | 61.7 | 63.6 |
| 1-phenyl-1,4,9-decatriene | 48.6 | 9.2 | 23.4 | 51.3 | 10.1 | 12.9 | 13.1 |
| Non-volatile | 6.2 | 5.8 | 4.1 | 7.1 | 9.7 | 8.6 | 4.2 |

It will be noted from the data of Table 9 that butadiene and styrene may be rapidly co-oligomerized by the present catalysts to high selectivities of 1-phenyl-3,7-cyclodecadiene and 1-phenyl-1,4,9-decatriene. The selectivity of the phenyl-substituted cyclodecadiene may be increased by operating at lower reaction temperatures, e.g. below about 80° C.

As is known in the art, the linear triene oligomers, such as 1,4,9-decatriene and 1-phenyl-1,4,9-decatriene, which are produced using the present catalysts, are useful as third monomers in the manufacture of ethylene-propylene terpolymers. The unsaturated cyclic oligomer products, such as 1,5,9-cyclododecatriene, 1,5-cyclodecadiene and 1-phenyl-3,7-cyclodecadiene may be converted by known procedures to useful dibasic acids or like useful compounds.

While the invention has been described above with respect to certain preferred embodiments thereof, it will be understood by those skilled in the art that various changes and modifications may be made without departing from the spirit and scope of the invention, and it is intended to cover all such changes and modifications in the appended claims:

Therefore, we claim:

1. A process for preparing a catalyst composition which comprises admixing under substantially anhydrous conditions
  (a) a nickel compound selected from the group consisting of nickel (II) and nickel (III) compounds,
  (b) a reducing agent capable of reducing the valence of nickel to below 2 which is selected from the group consisting of metals of Groups I–A, II–A, II–B, III–A and IV–A and hydride and organometallic compounds of said metals and boron,
  (d) a molecular organic Lewis base.

2. Processes as in claim 1 wherein said reducing agent is represented by the formula $R_aAlX_b$ wherein R is a radical selected from the group consisting of hydride and hydrocarbyl radicals, X is a radical selected from the group consisting of halide and hydrocarboxy radicals, $a$ is from 1 to 3, $b$ is from 0 to 2 and the sum of $a$ plus $b$ is 3.

3. Process as in claim 2 wherein said reducing agent is a trialkyl-aluminum compound.

4. Process as in claim 1 wherein the valence of nickel is reduced to 0 upon mixing with said reducing agent.

5. Process as in claim 1 wherein said Lewis base is an aliphatic conjugated diolefin.

6. Process as in claim 5 wherein said conjugated diolefin is 1,3-butadiene.

7. Process as in claim 1 wherein the mole ratio of said reducing agent to said nickel compound is from about 0.1:1 to about 50:1, the mole ratio of carbon monoxide to said nickel compound is from about 0.3:1 to about 3.5:1 and the mole ratio of said Lewis base to said nickel compound is at least about 0.5:1.

8. Process as in claim 7 wherein the mole ratio of said reducing agent to said nickel compound is from about 1:1 to about 12:1, the mole ratio of carbon monoxide to said nickel compound is from about 0.5:1 to about 1.5:1 and the mole ratio of said Lewis base to said nickel compound is at least about 2:1.

9. A process for preparing a catalyst composition which comprises admixing under substantially anhydrous conditions a nickel compound selected from the group consisting of nickel (II) and nickel (III) compounds, a reducing agent capable of reducing the valence of nickel to below 2, carbon monoxide, a first molecular organic Lewis base consisting of a conjugated aliphatic diolefin and a second molecular organic Lewis base consisting of an organic derivative of a Group V–A element.

10. Process as in claim 9 wherein said Group V–A element is nitrogen.

11. Process as in claim 10 wherein said organic derivative of nitrogen is an acylamido compound represented by the formula

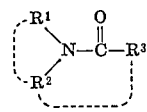

wherein $R^1$ alone is selected from the group consisting of hydrogen, hydrocarbyl and substituted hydrocarbyl radicals, $R^2$ alone is selected from the group consisting of $R^1$, hydroxy, hydrocarboxy, nitroso, amino, carbonyl and

radicals, $R^3$ alone is selected from the group consisting of hydrocarbyl, substituted hydrocarbyl, hydrocarboxy, and amino radicals, and

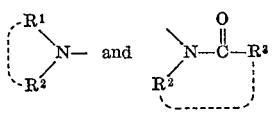

each represent a heterocyclic radical having 5–6 inclusive carbon atoms.

12. Process as in claim 9 wherein the valence of nickel is reduced to 0 upon mixing with said reducing agent.

13. Process as in claim 9 wherein said conjugated aliphatic diolefin is 1,3-butadiene and said organic derivative of a Group V–A element is N-methyl-2-pyrrolidone.

14. Process as in claim 9 wherein the mole ratio of said reducing agent to said nickel compound is from about 0.1:1 to about 50:1, the mole ratio of carbon monoxide to said nickel compound is from about 0.3:1 to about 3.5:1, the mole ratio of said conjugated aliphatic diolefin to said nickel compound is at least about 0.5:1 and the mole ratio of said organic derivative of a Group V–A element to said nickel compound is from about 0.5:1 to about 6:1.

15. Process as in claim 14 wherein the mole ratio of said reducing agent to said nickel compound is from about 1:1 to about 12:1, the mole ratio of carbon monoxide to said nickel compound is from about 0.5:1 to about 1.5:1, the mole ratio of said conjugated aliphatic diolefin to said nickel compound is at least about 2:1 and the mole ratio of said organic derivative of a Group V–A element to said nickel compound is from about 2.5:1 to about 3.5:1.

16. A catalyst composition comprising the interaction products of:
(a) a nickel compound selected from the group consisting of nickel (II) and nickel (III) compounds,
(b) a reducing agent capable of reducing the valence of nickel to below 2 which is selected from the group, consisting of metals of Groups I–A, II–A, II–B, III–A and IV–A and hydride and organometallic compounds of said metals and boron,
(c) carbon monoxide, and
(d) a molecular organic Lewis base.

17. Composition as in claim 16 wherein said reducing agent is represented by the formula $R_aAlX_b$ wherein R is a radical selected from the group consisting of hydride and hydrocarbyl radicals, X is a radical selected from the group consisting of halide and hydrocarboxy radicals, $a$ is from 1 to 3, $b$ is from 0 to 2, and the sum of $a$ pulse $b$ is 3.

18. Composition as in claim 17 wherein said reducing agent is a trialkylaluminum compound.

19. Composition as in claim 16 wherein the valence of nickel in said composition is reduced to 0 upon mixing with said reducing agent.

20. Composition as in claim 16 wherein said Lewis base is an aliphatic conjugated diolefin.

21. Composition as in claim 20 wherein said conjugated diolefin is 1,3-butadiene.

22. Composition as in claim 16 wherein the mole ratio of said reducing agent to said nickel compound is from about 0.1:1 to about 50:1, the mole ratio of carbon monoxide to said nickel compound is from about 0.3:1 to about 3.5:1 and the mole ratio of said Lewis base to said nickel compound is at least about 0.5:1.

23. Composition as in claim 22 wherein the mole ratio of said reducing agent to said nickel compound is from about 1:1 to about 12:1, the mole ratio of carbon monoxide to said nickel compound is from about 0.5:1 to about 1.5:1 and the mole ratio of said Lewis base to said nickel compound is at least about 2:1.

24. A catalyst composition comprising the interaction products of:
(a) a nickel compound selected from the group consisting of nickel (II) and nickel (III) compounds,
(b) a reducing agent capable of reducing the valence of nickel to below 2,
(c) carbon monoxide,
(d) a first molecular organic Lewis base consisting of a conjugated aliphatic diolefin, and
(e) a second molecular organic Lewis base consisting of an organic derivative of a Group V–A element.

25. Composition as in claim 24 wherein said Group V–A element is nitrogen.

26. Composition as in claim 25 said organic derivative of nitrogen is an acylamido compound represented by the formula:

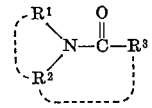

wherein $R^1$ alone is selected from the group consisting of hydrogen, hydrocarbyl and substituted-hydrocarbyl radicals, $R^2$ alone is selected from the group consisting of $R^1$, hydroxy, hydrocarboxy, nitroso, amino, carbonyl, and

radicals, $R^3$ alone is selected from the group consisting of hydrocarbyl, substituted hydrocarbyl, hydrocarboxy and amino radicals, and

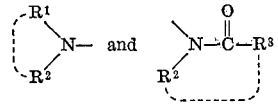

each represent a heterocyclic radical having 5–6 inclusive carbon atoms.

27. Composition as in claim 24 wherein the valence of nickel in said composition is reduced to 0 upon mixing with said reducing agent.

28. Composition as in claim 24 wherein said conjugated aliphatic diolefin is 1,3-butadiene and said organic derivative of a Group V–A element is N-methyl-2-pyrrolidone.

29. Composition as in claim 24 wherein the mole ratio of said reducing agent to said nickel compound is from about 0.1:1 to about 50:1, the mole ratio of carbon monoxide to said nickel compound is from about 0.3:1 to about 3.5:1, the mole ratio of said conjugated aliphatic diolefin to said nickel compound is at least about 0.5:1 and the mole ratio of said organic derivative of a Group V–A element to said nickel compound is from about 0.5:1 to about 6:1.

30. Composition as in claim 29 wherein the mole ratio of said reducing agent to said nickel compound is from about 1:1 to about 12:1, the mole ratio of carbon monoxide to said nickel compound is from about 0.5:1 to about 1.5:1, the mole ratio of said conjugated aliphatic diolefin to said nickel compound is at least about 2:1 and the mole ratio of said organic derivative of a Group V-A to said nickel compound is from about 2.5:1 to about 3.5:1.

References Cited

UNITED STATES PATENTS

| | | | |
|---|---|---|---|
| 3,392,203 | 7/1968 | Olechowski | 260—666 |
| 3,277,099 | 10/1966 | Seibt | 260—666 |
| 2,886,591 | 5/1959 | Lautenschlager | 260—486 |
| 2,952,523 | 9/1960 | Podall | 23—203 |
| 3,032,544 | 5/1962 | Longiave | 260—94.3 |

OTHER REFERENCES

Chem. Review, vol. 21, No. 1, August 1937, pp. 3–38.

DANIEL E. WYMAN, Primary Examiner

PHILIP M. FRENCH, Assistant Examiner

U.S. Cl. X.R.

252—431

PO-1050
(5/69)

UNITED STATES PATENT OFFICE
CERTIFICATE OF CORRECTION

Patent No. 3,490,745          Dated January 20, 1970

Inventor(s) Sterling F. Chappell III, Jerome R. Olechowski, and Arthur A. Arseneaux It is certified that error appears in the above-identified patent and that said Letters Patent are hereby corrected as shown below:

Column 3, line 46, after "num" insert--and aluminum--.

Column 10, TABLE 3, below "Nonvolatile", "2.2" should read--2.3--.

Column 12, Claim 1, between lines 25 and 26, insert--(c) carbon monoxide, and--.

Column 13, Claim 17, line 74, "pulse", should read--plus--.

Column 15, Claim 30, line 7, after "Group V-A" insert--element--.

SIGNED AND
SEALED
DEC 8 1970

(SEAL)
Attest:

Edward M. Fletcher, Jr.
Attesting Officer

WILLIAM E. SCHUYLER, JR.
Commissioner of Patents